(12) United States Patent
Bavaresco et al.

(10) Patent No.: US 12,742,483 B2
(45) Date of Patent: Sep. 22, 2026

(54) BRAKE-WEAR MONITORING SYSTEM

(71) Applicant: DANA ITALIA S.R.L., Arco (IT)

(72) Inventors: Federico Bavaresco, San Zeno di Montagna (IT); Davide Deimichei, Trento (IT); Gian Mario Ravasi, Arco (IT); Matteo Grott, Arco (IT)

(73) Assignee: DANA ITALIA S.R.L., Arco (IT)

( * ) Notice: Subject to any disclaimer, the term of this patent is extended or adjusted under 35 U.S.C. 154(b) by 405 days.

(21) Appl. No.: 18/506,970

(22) Filed: Nov. 10, 2023

(65) Prior Publication Data

US 2024/0159288 A1 May 16, 2024

(30) Foreign Application Priority Data

Nov. 11, 2022 (DE) .................... 20 2022 106 358.3

(51) Int. Cl.
*F16D 66/02* (2006.01)
*F16D 66/00* (2006.01)

(52) U.S. Cl.
CPC ...... *F16D 66/027* (2013.01); *F16D 2066/003* (2013.01)

(58) Field of Classification Search
CPC . F16D 66/027; F16D 66/028; F16D 2066/003
See application file for complete search history.

(56) References Cited

U.S. PATENT DOCUMENTS 6,257,374 B1 * 7/2001 Strzelczyk ............ B60T 17/221 188/1.11 E
8,405,386 B2 * 3/2013 Erickson ............... F16D 66/026 324/207.2
9,441,692 B2 * 9/2016 Schaefer ............... F16D 66/025
10,131,113 B2 * 11/2018 Troester .................. C04B 35/83
10,302,163 B2 * 5/2019 Rowe ....................... C04B 41/52
10,337,576 B2 * 7/2019 Lin ....................... F16D 66/028
10,941,826 B2 * 3/2021 Muniraju ................. G01D 5/40
2001/0030602 A1 * 10/2001 Osterman ............... B60T 17/22 340/453
2009/0229926 A1 * 9/2009 Schaefer ............... F16D 66/025 701/70
2010/0207608 A1 * 8/2010 Erickson ................... G01P 3/48 324/207.13
2012/0153753 A1 * 6/2012 Hanlon ................... F16D 55/36 29/428
2016/0069662 A1 * 3/2016 Mullenix .................. G06F 3/00 324/207.15
2016/0333955 A1 * 11/2016 Rowe .................... B29C 64/112
2018/0106320 A1 * 4/2018 Lin ....................... F16D 66/028
2019/0226542 A1 * 7/2019 Lin ....................... F16D 66/028
2019/0264764 A1 * 8/2019 Lin ....................... F16D 66/027
2020/0180587 A1 * 6/2020 Lin ....................... F16D 66/023
2021/0229651 A1 * 7/2021 Al-Tabakha .......... B60T 8/1703

* cited by examiner

*Primary Examiner* — Thomas W Irvin
(74) *Attorney, Agent, or Firm* — McCoy Russell LLP

(57) ABSTRACT

The present disclosure relates to a brake-wear monitoring system comprising a housing, a brake piston movable relative to the housing along a piston axis, and a sensor assembly configured to produce a sensor signal indicative of an axial position of the brake piston relative to the housing.

13 Claims, 7 Drawing Sheets

C-C
108
114
A
112
124
100
116
102

110
D-D
114
A
112
100
124
116
102

B-B
116
A
112
124
100
102

C-C
214
208
212
224
200
202
216
A
A

B-B
216
212
224
200
202
A
A

D-D
210
214
212
224
216
202
200
A
A

BRAKE-WEAR MONITORING SYSTEM

CROSS-REFERENCE TO RELATED APPLICATION

The present application claims priority to German Utility Model Application No. 20 2022 106 358.3, entitled "BRAKE-WEAR MONITORING SYSTEM", and filed on Nov. 11, 2022. The entire contents of the above-listed application is hereby incorporated by reference for all purposes.

TECHNICAL FIELD

The present disclosure relates to automotive technology, more specifically to a brake-wear monitoring system for use in an automotive vehicle.

BACKGROUND AND SUMMARY

Over time, brake systems in automotive vehicles undergo mechanical wear. For safety reasons it is therefore imperative that brake systems in automotive vehicles are monitored on a regular basis to make sure that worn out brake elements are overhauled or replaced once mechanical wear has reached a critical level.

Known brake systems are typically checked manually through an inspection hole using a caliper. However, such manual inspection is often time consuming, requires a specifically trained operator, and may pose a safety risk for the operator performing the inspection.

Thus, there is demand for a brake-wear monitoring system which can be used safely and easily.

This demand is met by a brake-wear monitoring system including the features as described here.

The presently proposed brake-wear monitoring system comprises a housing, a brake piston movable relative to the housing along a piston axis, and a sensor assembly, wherein the sensor assembly is configured to produce a sensor signal indicative of an axial position of the brake piston relative to the housing.

The proposed brake-wear monitoring system allows monitoring the axial position of the brake piston relative to the housing automatically and contactlessly. Determining the axial position of the brake piston relative to the housing when the brake piston compresses a brake pack including a plurality of rotor plates and/or stator plates, allows determining a level of wear of the brake pack, for example.

The sensor assembly of the brake-wear monitoring system may include an inductive sensor. Inductive sensors such as inductive proximity sensors are usually reliable, accurate and can be produced and maintained at low cost.

Inductive sensors typically rely on the electromagnetic inductance of one or more elements to determine the position of a component, typically of an electrically conducting component. To this end, the inductive sensor may comprise a tuned frequency oscillator tank circuit including a detector coil and a capacitance, a detection circuit, and an output circuit, for example. The frequency oscillator tank circuit may produce an oscillating current and/or voltage in the detector coil to generate a fluctuating magnetic field around the detector coil. When an electrically conducting object is then placed in the vicinity of the detector coil, eddy currents induced in the object produce an opposing magnetic field. This opposing magnetic field in turn influences the oscillating current in the frequency oscillator tank circuit. In one mode of operation, for example, the detection circuit may be configured to monitor an amplitude of the oscillating current and/or voltage in the frequency oscillator tank circuit and to cause the output circuit to produce an output signal when the amplitude of the oscillating current and/or voltage falls below a threshold amplitude. Additionally or alternatively, in another mode of operation, the detection circuit may be configured to monitor a frequency of the oscillating current and/or voltage in the frequency oscillator tank circuit and to cause the output circuit to produce an output signal when the frequency of the oscillating current and/or voltage exceeds or falls below a threshold frequency.

The brake-wear monitoring system may include a brake pack comprising one or more rotor plates and one or more stator plates. For instance, the brake piston may be configured to compress the brake pack to frictionally engage the one or more stator plates with the one or more rotor plates to exert a braking torque on the one or more rotor plates. As mechanical wear of the rotor plates and/or of the stator plates of the brake pack causes an axial thickness of the brake pack to gradually decrease over time, the axial position of the brake piston relative to the housing when the brake piston compresses the brake pack is typically indicative of a level of wear of the rotor plates and/or of the stator plates of the brake pack.

In the following, different variants of the brake-wear monitoring system including the above-described brake pack will be explained.

The brake-wear monitoring system may comprise a control unit, wherein when the brake piston compresses the brake pack, the control unit is configured to determine, based on the sensor signal produced by the sensor assembly, whether an axial thickness of the brake pack is smaller than a threshold thickness. Typically, the threshold thickness is defined as a lower limit for an acceptable level of wear of the brake pack. For example, the control unit may be configured to issue a warning when or once the control unit determines that the axial thickness of the brake pack is smaller than the threshold thickness. For instance, in this case the control unit may cause a warning device to emit an optical warning signal and/or an acoustic warning signal.

Additionally or alternatively, the control unit may be configured to determine, based on the sensor signal produced by the sensor assembly, an axial thickness of the brake pack, when the brake piston compresses the brake pack, for example based on an amplitude and/or based on a frequency of the sensor signal. For example, the sensor assembly and the control unit may be configured to determine the axial thickness of the brake pack with an accuracy of less than 200 micro meters, of less than 100 micro meters, or of less than 50 micro meters.

Additionally or alternatively, the sensor assembly may include a first sensor portion mounted on the housing and a second sensor portion mounted on the brake piston or formed in one piece with the brake piston. In some embodiments, the second sensor portion may be the piston itself, or possibly a piece of a detectable material mounted on the piston in case the brake piston is made of a non-detectable material. For example, the second sensor portion may include a rod or spine mounted on the brake piston.

The sensor assembly may be configured and/or mounted such that a shortest distance between the first sensor portion and the second sensor portion is aligned parallel to the piston axis. This geometric configuration typically allows a precise measurement of the axial position of the brake piston and, therefore, of the wear of the disk-brake system.

Some embodiments may include the brake pack and the sensor assembly including the first sensor portion and the second sensor portion as described above. In the following, some of these embodiments will be described in more detail.

For example, along the piston axis the brake pack may be disposed in between at least a portion of the brake piston and the first sensor portion. This geometry usually allows a precise measurement of the thickness of the brake pack. Additionally or alternatively, along the piston axis the second sensor portion may extend past or beyond the brake pack. The sensor assembly may be configured and/or mounted such that a distance between the first sensor portion and the second sensor portion is minimized when the brake piston compresses the brake pack. This typically allows a precise measurement of the axial position of the brake piston.

Additionally or alternatively, the brake-wear monitoring system may comprise a mechanical adjustment device for mechanically adjusting an axial position of at least a portion of the sensor assembly. The mechanical adjustment device may be at least partially disposed outside the housing and/or the mechanical adjustment device or a portion thereof may be accessible from outside the housing. Using the mechanical adjustment device, a distance or an axial distance between brake piston and the sensor assembly or a portion thereof can be adjusted, for example when the brake piston compresses the brake pack.

The mechanical adjustment device may comprise a male threaded portion at least partially received in and engaged with a female-threaded through boring extending from an inside of the housing to the outside of the housing. At least a portion of the sensor assembly, for example the first sensor portion, may be mounted on the mechanical adjustment device. The female-threaded through boring may extend parallel to the piston axis, for example.

The present disclosure also includes methods of calibrating any of the above described embodiments of the brake-wear monitoring system comprising the brake pack and the mechanical adjustment device.

A method of calibrating the brake-war monitoring systems may comprise the steps: While the brake piston compresses the brake pack, adjusting an axial position of at least a portion of the sensor assembly, for example of the first sensor portion, until said sensor portion reaches a calibration position at which the sensor signal produced by the sensor assembly reaches or exceeds or falls below a calibration threshold. In this first step of the method, adjusting the axial position of the sensor portion may include axially moving the sensor portion toward the brake piston. The sensor signal reaching or exceeding a calibration threshold may include an amplitude of a current and/or voltage in the detector coil reaching or exceeding a threshold amplitude. Additionally or alternatively, the sensor signal falling below a calibration threshold may include a frequency of a current and/or voltage in the detector coil falling below a threshold frequency.

In a first embodiment, the calibration method may further comprise: While the brake piston continues to compress the brake pack, axially moving the portion of the sensor assembly from the calibration position by a calibration distance. In this second step of the method, axially moving the sensor portion, for example the first sensor portion, from the calibration position may include axially moving the sensor portion in a direction away from the brake piston. The calibration distance may be a predetermined distance. For example, the calibration distance may correspond to a maximum tolerable reduction in the axial thickness of the brake pack.

And in a second embodiment, the calibration method may further comprise: While the brake piston continues to compress the brake pack, axially moving a portion of the sensor assembly, such as the first sensor portion, relative to the housing and towards or away from the brake piston in a stepwise manner by predetermined and/or known increments, and at each of the axial positions of the inductive sensor relative to the brake piston recording the sensor signal produced by the sensor assembly and storing the axial position of the sensor portion and the sensor signal produced at the corresponding position in a table. For instance, the sensor signal recorded and stored at each of the axial positions of the inductive sensor may include an amplitude and/or a frequency of a current and/or voltage in the detector coil. Optionally, the values of the axial positions and of the sensor signals stored in the table may be interpolated to produce a continuous function assigning an axial position value to each signal value. In the second embodiment of the calibration method, the sensor portion may then be moved to an operating axial position.

In the following, embodiments of the presently proposed brake-wear monitoring system are described with reference to the Figures.

DETAILED DESCRIPTION

A first embodiment of the presently proposed brake-wear monitoring system will be described with reference to FIGS. 1, 2, and 3A-C. Here and in all of the following, features recurring in different figures are designated with the same or with similar reference signs, see also the list of reference signs at the end of this description.

Figure 1:
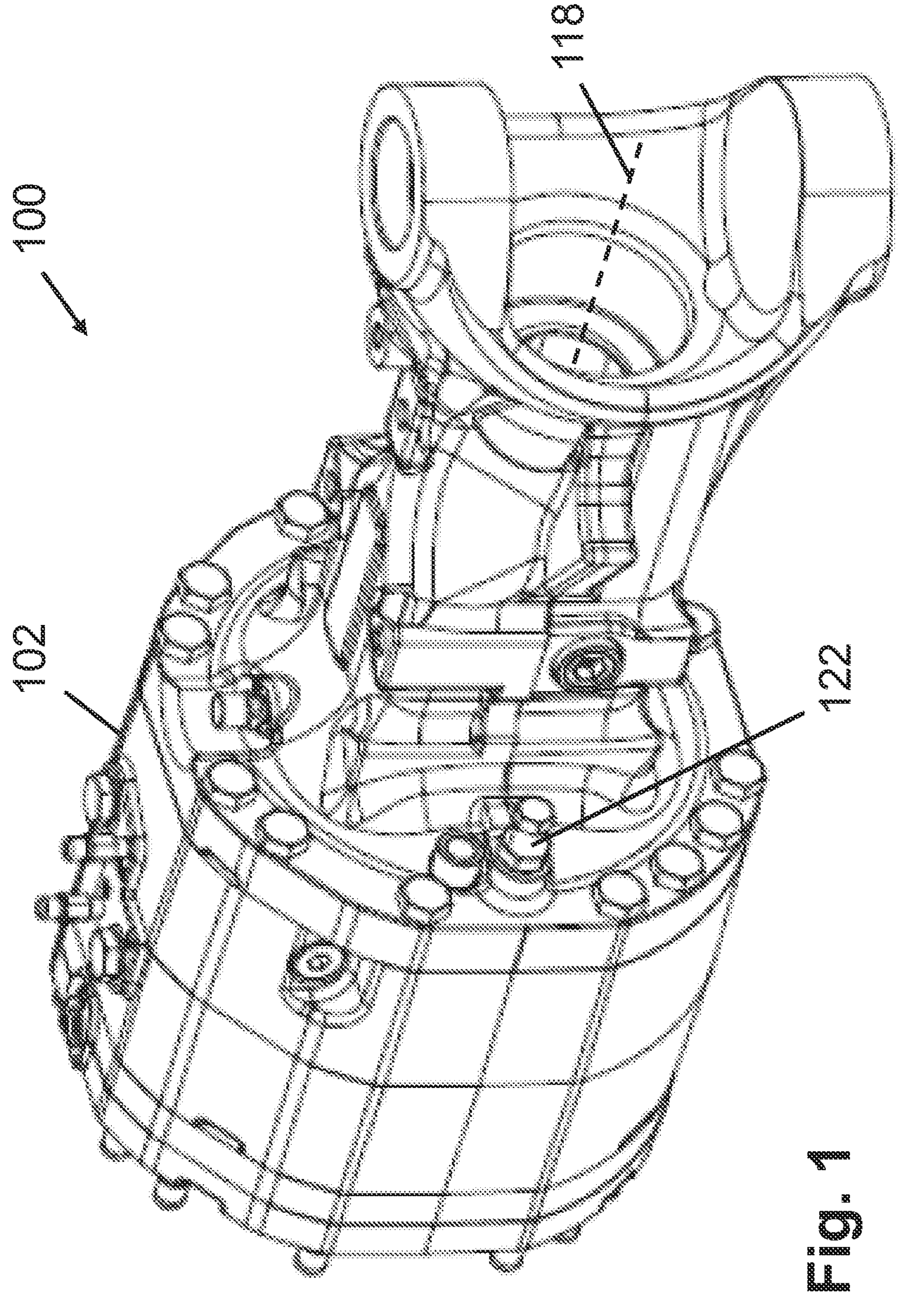
FIG. 1 schematically shows a perspective view of a brake-wear monitoring system according to a first embodiment.
Figure 2:
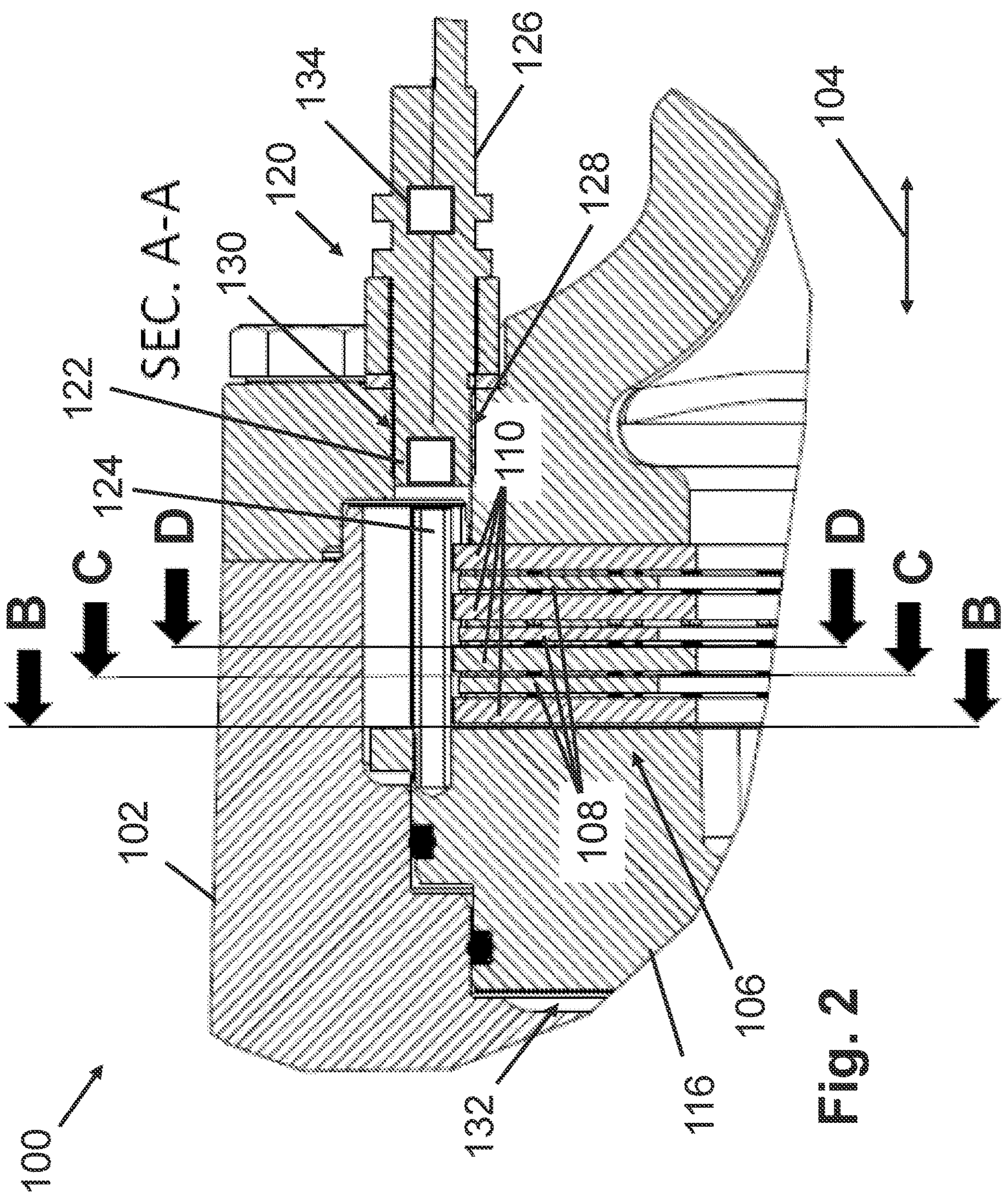
FIG. 2 schematically shows a cross-sectional view of the brake-wear monitoring system of FIG. 1, wherein the sectional plane is arranged parallel to an axis of movement of a brake piston.
Figures 3A, 3B, 3C:
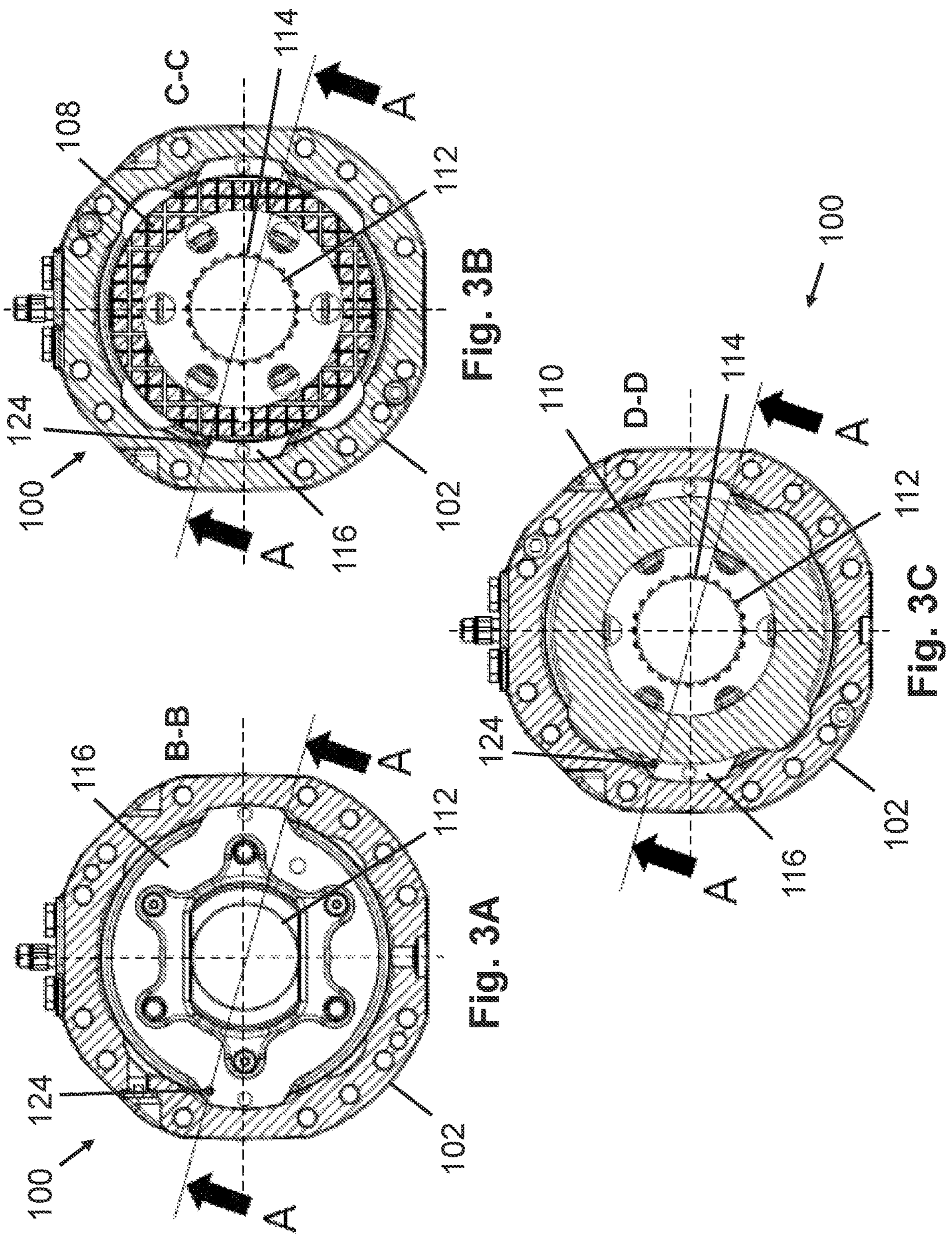
FIGS. 3A-C each schematically show a different cross-sectional view of the brake-wear monitoring system of FIGS. 1 and 2, wherein the sectional plane is arranged perpendicular to the axis of movement of the brake piston.
Figure 4:
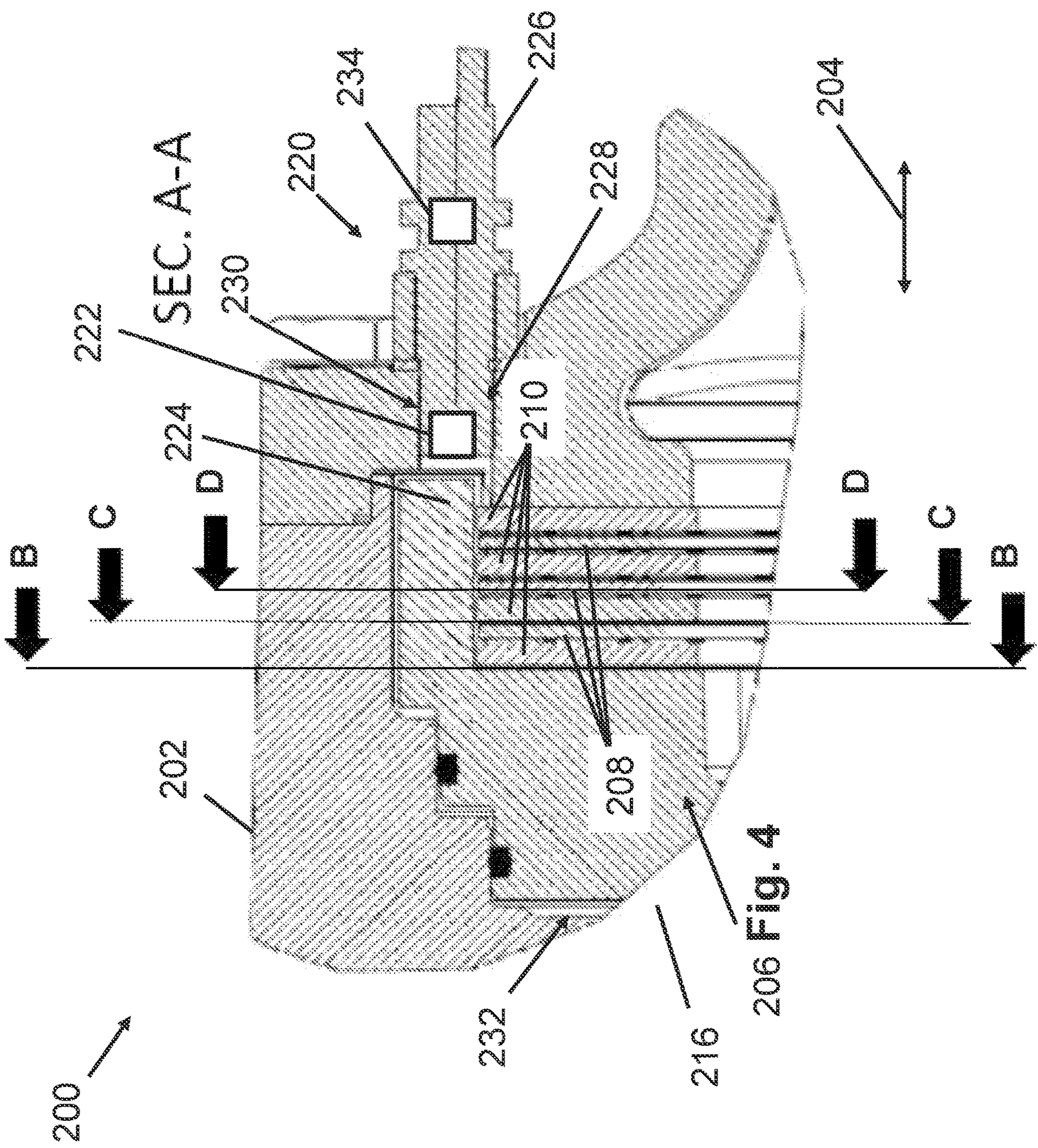
FIG. 4 schematically shows a cross-sectional view of a brake-wear monitoring system according to a second embodiment, wherein the sectional plane is arranged parallel to an axis of movement of a brake piston.

FIG. 1 schematically shows a perspective view of a brake-wear monitoring system 100. The brake-wear monitoring system 100 may be arranged in a vehicle, for example in an off-highway vehicle such as a mining vehicle, a loader, an excavator, a telehandler or a forklift. FIG. 2 schematically shows a cross-sectional view of the system 100 along a sectional plane including a rotation axis 118 (see FIG. 1) of an axle shaft 112 (see FIGS. 3A-C). The axle shaft 112 may be a drive shaft, for example. FIGS. 3A-C show three different cross-sectional views perpendicular to the rotation axis 118 of the axle shaft 112. The rotation axis 118 defines an axial direction. For instance, FIGS. 3A-C show cross-sectional views along planes marked B-B, C-C, and D-D in FIG. 2, respectively. In addition, FIGS. 3A-C also show a plane A-A indicating the position of the sectional plane of FIG. 2.

The brake-wear monitoring system 100 comprises a housing 102, and a brake pack 106 and a brake piston 116 disposed at least partially within the housing 102. The brake pack includes a plurality of rotor plates 108 which are rotationally fixed to the axle shaft 112, and a plurality of stator plates 110 which are rotationally fixed to the housing 102. The rotor plates 108 and the stator plates 110 extend perpendicular to the rotation axis 118 and are alternatingly arranged along the rotation axis 118. The rotor plates 108 are connected to the axle shaft 112 via a splined connection 114. The splined connection 114 includes axially extending splines formed on a radially outer surface of the axle shaft 112 which are engaged with correspondingly shaped axially extending notches or recesses formed in a radially inner surface of the rotor plates 108, respectively. The splined connection 114 between the axle shaft 112 and the rotor plates 108 provides a torque-proof connection between the axle shaft 112 and the rotor plates 108 so that the rotor plates 108 rotate with the axle shaft 112. At the same time, the splined connection 114 between the axle shaft 112 and the rotor plates 108 allows the rotor plates 108 to slide on the axle shaft 112 in the axial direction relative to the housing 102.

The stator plates 110 may comprise radially extending protrusions received in correspondingly shaped recesses formed in the housing 102. Along the rotation axis 118, the stator plates 110 may move or slide relative to the housing 102. The brake piston 116 may be moved relative to the housing 102 along a piston axis 104 parallel to the rotation axis 118 of the axle shaft 112 to selectively compress the brake pack 106 to frictionally engage the stator plates 110 with the rotor plates 108 to exert a braking torque on the rotor plates 108 and on the axle shaft 112. For example, the brake piston 116 may be actuated via hydraulic forces, for example by filling a piston chamber 132 with a liquid such as oil. In order to increase friction between the rotor plates 108 and the stator plates 110, surfaces of the rotor plates 108 and/or of the stator plates 110 may have a brake lining disposed thereon.

To monitor mechanical wear of the brake pack 106, for example mechanical wear of the rotor plates 108 and/or of the stator plates 110, the brake-wear monitoring system 100 further comprises a sensor assembly 120 configured to produce a sensor signal indicative of an axial position of the brake piston 116 relative to the housing 102.

In the embodiment of the brake-wear monitoring system 100 illustrated here, the sensor assembly 120 comprises an inductive sensor 122, more specifically an inductive proximity sensor, and a rod 124 mounted on or attached to the brake piston 116. The rod 124 is made of or comprises an electrically conducting material, for example a metal such as iron or steel. The inductive sensor 122 constitutes a first sensor portion of the sensor assembly 120, and the electrically conducting rod 124 constitutes a second sensor portion of the sensor assembly 120. Along the piston axis 104, the brake pack 106 is disposed in between the brake piston 116 and the inductive sensor 122. Furthermore, along the piston axis 104 and in a direction pointing away from the brake piston 116, the second sensor portion, e.g. the rod 124, extends past the brake pack 106.

When the brake piston 116 is actuated and moves towards the brake pack 106 to compress the brake pack 106, the rod 124 moves towards the inductive sensor 122. That is, as the brake piston 116 compresses the brake pack 106, a distance between the inductive sensor 122 and an end of the rod 124 facing the inductive sensor 122 is minimized. Furthermore, in the embodiment shown in FIGS. 1, 2, and 3A-C, the shortest distance between the inductive sensor 122 and the rod 124 is aligned parallel to the piston axis 104. However, in other embodiments other geometrical configurations are possible.

The inductive sensor 122 is configured to measure the distance between the inductive sensor 122 and the rod 124. Therefore, when the piston 116 compresses the brake pack 106, the measured distance is indicative of an axial thickness of the brake pack 106 including the rotor plates 108 and the stator plates 110. As a result, a change over time in the distance between the inductive sensor 122 and the rod 124 measured by the inductive sensor 122 when the brake piston 116 compresses the brake pack 106 is a measure of a thinning of the plates 108, 110 of the brake pack 106.

In the embodiment of the system 100 shown in the figures of the present disclosure, in order to measure the distance between the inductive sensor 122 and the rod 124, the inductive sensor 122 comprises a tuned frequency oscillator tank circuit including a detector coil and a capacitance, a detection circuit, and an output circuit (not shown). Power applied to the tuned frequency oscillator tank circuit creates a high frequency alternating electric current and/or voltage in the detector coil which generates a corresponding high frequency magnetic field. The high frequency magnetic field generated by the detector coil may induce eddy currents in the electrically conducting rod 124. An amplitude of the eddy currents induced in the rod 124 and/or a strength of a back action of the eddy currents induced in the rod 124 on the alternating current and/or frequency in the dector coil are a function of the distance between the electrically conducting rod 124 and the inductive sensor 122. More specifically, the smaller the distance between the inductive sensor 122 and the rod 124, the greater the amplitude of the eddy currents induced in the rod 124 and the greater the back action of the eddy currents induced in the rod 124 on the current and/or voltage oscillation in the tuned frequency oscillator tank circuit. Consequently, a measured change in the current and/or voltage oscillation in the tuned frequency oscillator tank circuit is indicative of a change in the distance between the rod 124 and the inductive sensor 122, i. e. of a change in the thickness of the brake pack 106.

The brake-wear monitoring system 100 also comprises a control unit 134 in communication with the inductive sensor 122 which is configured to determine, based on the sensor signal produced by the sensor assembly 120, whether an axial thickness of the brake pack 106 is smaller than a threshold thickness. Typically, the control unit 134 comprises electric circuitry. For instance, the control unit 132 may include a programmable processing unit such as a microprocessor, an FPGA, or the like. Additionally or alternatively, the control unit 134 may be configured to determine, based on the sensor signal produced by the sensor assembly 120, an axial thickness of the brake pack 106. The control unit 134 may further be configured to trigger an alarm when it determines that mechanical wear of the brake pack 106 has reached a critical level.

In order to facilitate calibration of the brake-wear monitoring system 100, the brake-wear monitoring system 100 comprises a mechanical adjustment device 126. The mechanical adjustment device 126 allows adjusting an axial position of the inductive sensor 122 relative to the housing 102. To facilitate adjusting the axial position of the inductive sensor 122, the mechanical adjustment device 126 is accessible from outside the housing 102. For example, the mechanical adjustment device 126 may be at least partially disposed outside the housing 102. In the embodiment of the brake-wear monitoring system 100 depicted here, the mechanical adjustment device 126 comprises a male threaded portion 130 fixed to the inductive sensor 122. The male threaded portion 130 of the mechanical adjustment device 126 is received in a through boring 128 extending from an inside of the housing 102 to the outside of the housing 102. The through boring 128 includes a female threaded portion extending in the axial direction. The male threaded portion 130 of the mechanical adjustment device 126 is engaged with the female threaded portion of the through boring 128. The axial position of the inductive sensor 122 relative to the housing 102 and relative to the brake piston 116, for example when the brake piston 116 compresses the brake pack 106, can be adjusted by axially moving the threads of the male threaded portion 130 relative to the threads of the female threaded portion of the through boring 128. How this adjustment can be used to calibrate the brake-wear monitoring system 118, will be explained later with reference to FIG. 6.

Figures 5A, 5B, 5C:
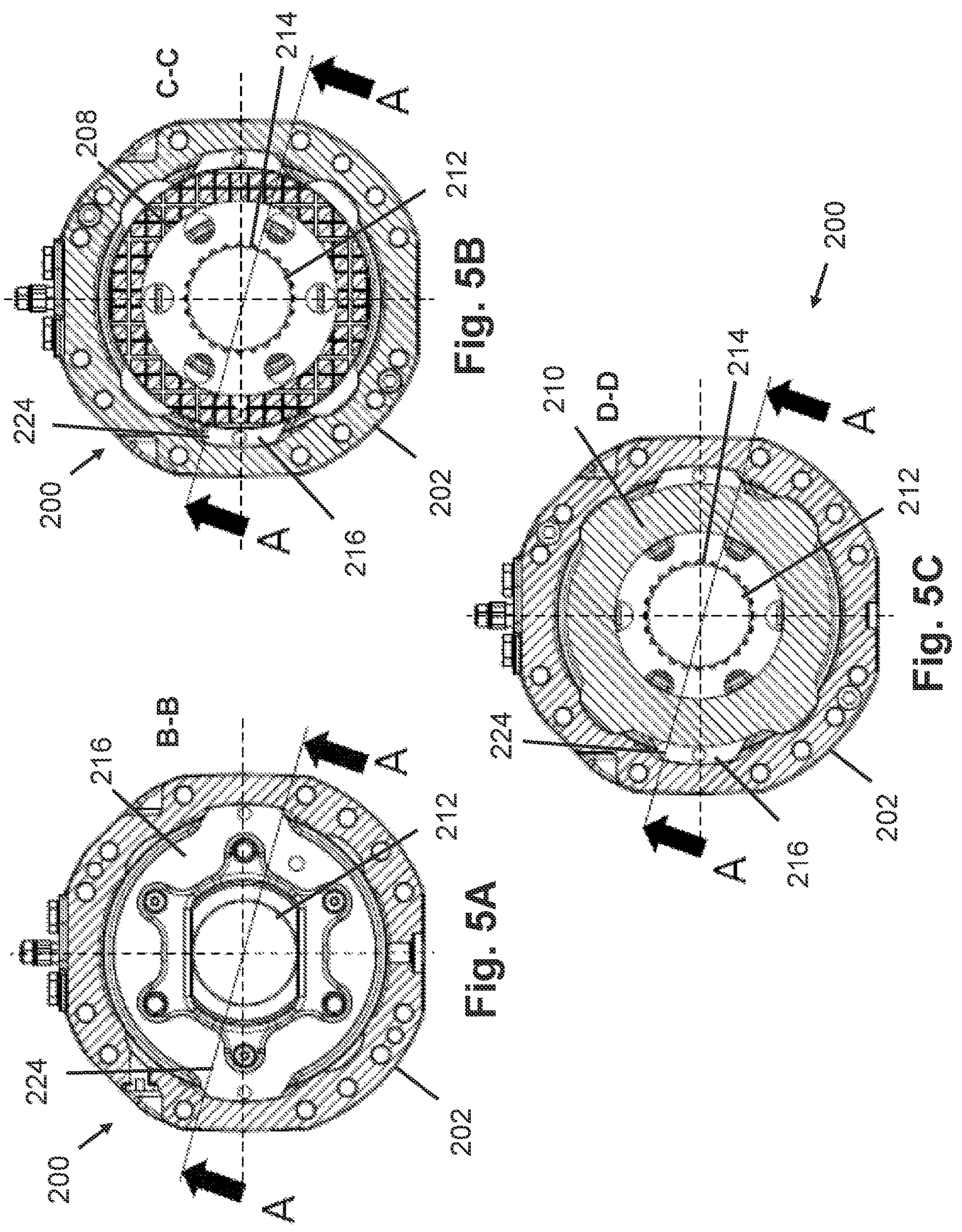
FIGS. 5A-C each schematically show a different cross-sectional view of the brake-wear monitoring system of FIG. 4, wherein the sectional plane is arranged perpendicular to the axis of movement of the brake piston.

FIGS. 4 and 5A-C schematically show a brake-wear monitoring system 200 according to a second embodiment. As before, features recurring in different figures are designated with the same or with similar reference signs, see the list of reference signs at the end of this description. Specifically, FIGS. 5A-C show three different cross-sectional views perpendicular to a rotation axis 218 of an axle shaft 212. For instance, FIGS. 5A-C show cross-sectional views along planes marked B-B, C-C, and D-D in FIG. 4, respectively. In addition, FIGS. 5A-C also show a plane A-A indicating the position of the sectional plane of FIG. 4.

The brake assembly 200 shown in FIG. 4 and FIGS. 5A-C is largely identical to the brake assembly 100 of FIGS. 2 and 3A-C. Therefore, for brevity and simplicity, in the following only differences between the brake-wear monitoring system 200 of FIGS. 4 and 5A-C and the brake-wear monitoring system 100 of FIGS. 2 and 3A-C are explained in some detail. Unless explicitly stated otherwise, the brake-wear monitoring system 200 of FIGS. 4 and 5A-C may include the same features as the brake-wear monitoring system 100 of FIGS. 2 and 3A-C.

The brake-wear monitoring system 200 of FIGS. 4 and 5A-C differs from the brake-wear monitoring system 100 of FIGS. 2 and 3A-C in that in the brake-wear monitoring system 200 of FIGS. 4 and 5A-C the rod 224 is formed or made in one piece with the brake piston 216. For example, the brake piston 216 and the rod 224 may be made of or may comprise an electrically conducting material, for example a metal such as steel or iron.

Methods of calibrating the brake-wear monitoring systems 100, 200 will be described in the following with reference to FIGS. 6A and 6B.

Figure 6A:
FIG. 6A-B each schematically show steps a method of calibrating a brake-wear monitoring system.

Steps of a first method of calibrating the brake-wear monitoring systems 100, 200 are schematically illustrated in FIG. 6A.

In a first step 302, the brake piston 116, 216 is actuated and compresses the brake pack 106, 206.

In a second step 304, while the brake piston 116, 216 continues to compress the brake pack 106, 206, an axial position of the inductive sensor 122, 222 relative to the housing 102, 202 and relative to the brake piston 116, 216 is adjusted until the inductive sensor 122, 222 reaches a calibration position along the piston axis 104, 204 at which a sensor signal produced by the inductive sensor 122, 222, for example an amplitude and/or a frequency of an oscillating current and/or voltage in the frequency oscillator tank circuit, reaches or exceeds or falls below a calibration threshold, for example a threshold amplitude of a current and/or voltage in the detector coil, and/or a threshold frequency of a current and/or voltage in the detector coil. Here, the axial position of the inductive sensor 122, 222 is adjusted by moving the threads of the male threaded portion 130, 230 of the mechanical adjustment device 126, 226 along the threads of the female threaded portion of the through boring 128, 228 extending through the housing 102, 202. Adjusting the axial position of the inductive sensor 122, 222 typically includes moving the inductive sensor 122, 222 towards the brake piston 116, 216.

In a third step 306, while the brake piston 116, 216 continues to compress the brake pack 106, 206, the inductive sensor 122, 222 is axially moved from the calibration position, typically in a direction away from the brake piston 116, 216. For example, the inductive sensor 122, 222 may be moved from the calibration position by a predetermined calibration distance. The calibration distance may correspond to a maximum tolerable decrease in the thickness of the brake pack 106, 206 caused by mechanical wear of the rotor plates 108, 208 and/or by the stator plates 110, 210. This way, when or once wear of the brake pack 106, 206 has reduced its axial thickness by the calibration distance, a sensor signal produced by the inductive sensor 122, 222 when the brake piston 116, 216 compresses the brake pack 106, 206, for example during a braking maneuver, again reaches or exceeds or falls below the calibration threshold, as described in step 304. In response to the sensor signal again reaching or exceeding or falling below the calibration threshold, the control unit 134, 234 may output a warning signal in order to inform an operator or a mechanic so that brake components such as the rotor plates 108, 208 and/or the stator plates 110, 210 may be replaced, for example.

Figure 6B:
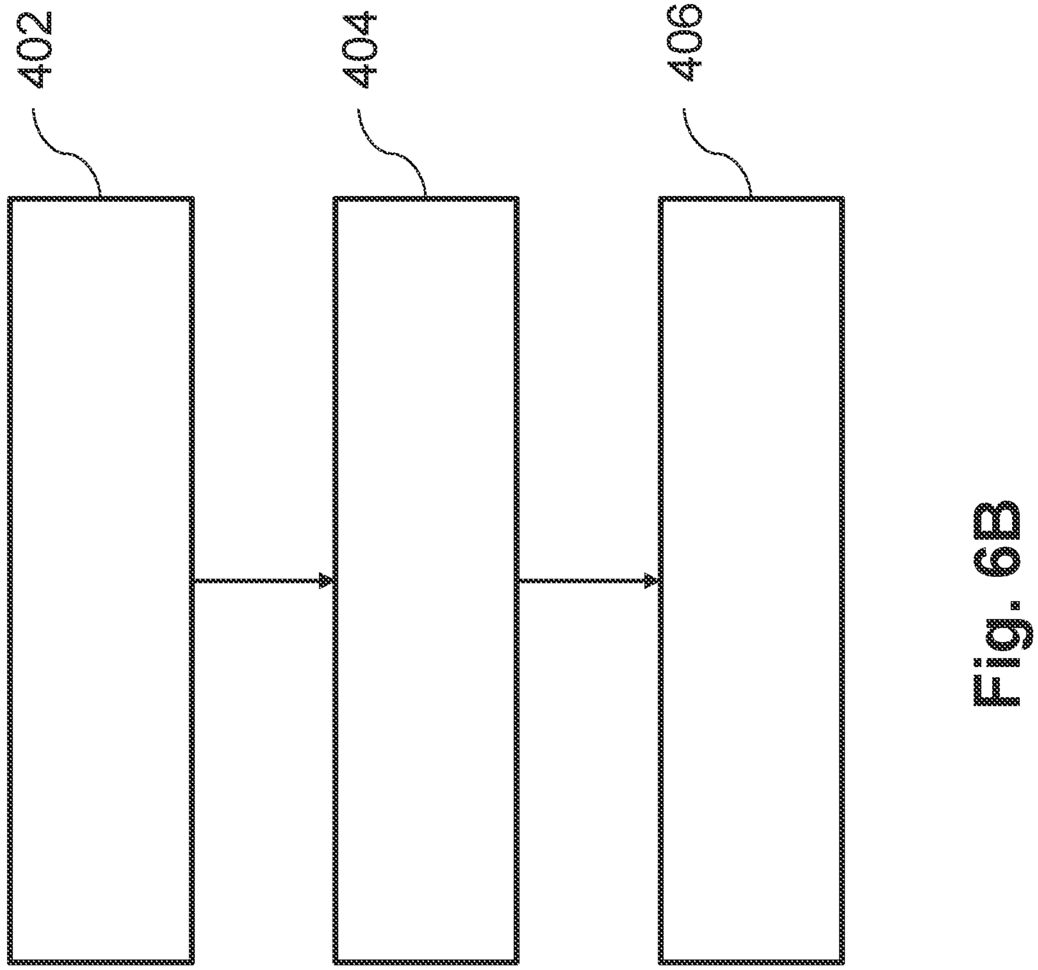

Steps of a second method of calibrating the brake-wear monitoring systems 100, 200 are schematically illustrated in FIG. 6B.

In a first step 402, the brake piston 116, 216 is actuated and compresses the brake pack 106, 206.

In a second step 404, while the brake piston 116, 216 continues to compress the brake pack 106, 206, the inductive sensor 122, 222 is axially moved relative to the housing 102, 202 towards or away from the brake piston 116, 216 in a stepwise manner by predetermined and/or known increments, for example by 200 μm increments or similar. At each of the axial positions of the inductive sensor 122, 222 relative to the brake piston 106, 202, the sensor signal produced by the sensor assembly 120, 220 is recorded and stored in a table in which each of the different axial positions of the inductive sensor 122, 222 relative to the brake piston 116, 216 is associated with the sensor signal produced at the corresponding axial position, respectively. For instance, the sensor signal recorded at each of the axial positions of the inductive sensor 122, 222 may include an amplitude and/or a frequency of a current and/or voltage in the detector coil. The table may be stored in a non-transitory memory of the control unit 134, 234, for example.

In a third step 406, the inductive sensor 122, 222 is fixed at a predetermined operating position along the piston axis 104, 204. Optionally, the values of the axial positions and of the sensor signal stored in the table may be interpolated to produce a continuous function assigning an axial position value to each signal value. In this manner, when, during operation of the system 100, 200, the brake piston 116, 216 compresses the brake pack 106, 206, the sensor signal produced by the sensor assembly 120, 220 is indicative of an axial thickness of the brake pack 106, 206. In response to the axial thickness of the brake pack 106, 206 measured in this way, the control unit 134, 234 may determine that the axial thickness of the brake pack 106, 206 has reached a critical level and may output a warning signal in order to inform an operator or a mechanic so that brake components such as the rotor plates 108, 208 and/or the stator plates 110, 210 may be replaced, for example.

FIGS. 1-5 are drawn to scale, although other relative dimensions may be used, if desired. FIGS. 1-5 show example configurations with relative positioning of the various components. Unless otherwise noted, if shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A brake-wear monitoring system, comprising:

a housing, a brake piston movable relative to the housing along a piston axis, a sensor assembly configured to produce a sensor signal indicative of an axial position of the brake piston relative to the housing; and a control unit in electronic communication with an inductive sensor that is included in the sensor assembly;

wherein the inductive sensor is positioned on an axial end of a mechanical adjustment device; and wherein the mechanical adjustment device is threaded into the housing such that the mechanical adjustment device extends from an outside of the housing to an inside of the housing.

2. The brake-wear monitoring system of claim 1, wherein the sensor assembly includes an inductive sensor.

3. The brake-wear monitoring system of claim 1, further including a brake pack comprising one or more rotor plates and one or more stator plates, the brake piston configured to compress the brake pack to frictionally engage the one or more stator plates with the one or more rotor plates to exert a braking torque on the one or more rotor plates.

4. The brake-wear monitoring system of claim 3, further comprising a control unit, wherein when the brake piston compresses the brake pack, the control unit is configured to determine, based on the sensor signal produced by the sensor assembly, whether an axial thickness of the brake pack is smaller than a threshold thickness.

5. The brake-wear monitoring system of claim 3, wherein when the brake piston compresses the brake pack, the control unit is configured to determine, based on the sensor signal produced by the sensor assembly, an axial thickness of the brake pack.

6. The brake-wear monitoring system of claim 3, wherein along the piston axis the brake pack is disposed in between at least a portion of the brake piston and the first sensor portion.

7. The brake-wear monitoring system of claim 3, wherein along the piston axis the second sensor portion extends past the brake pack.

8. The brake-wear monitoring system of claim 3, wherein a distance between the first sensor portion and the second sensor portion is minimized when the brake piston compresses the brake pack.

9. The brake-wear monitoring system of claim 1, wherein the sensor assembly includes a first sensor portion mounted on the housing and a second sensor portion mounted on the brake piston or formed in one piece with the brake piston.

10. The brake-wear monitoring system of claim 9, wherein a shortest distance between the first sensor portion and the second sensor portion is aligned parallel to the piston axis.

11. The brake-wear monitoring system of claim 1, further comprising a mechanical adjustment device for mechanically adjusting an axial position of at least a portion of the sensor assembly, wherein the mechanical adjustment device is at least partially disposed outside the housing and/or accessible from outside the housing.

12. The brake-wear monitoring system of claim 11, wherein the mechanical adjustment device comprises a male threaded portion at least partially received in and engaged with a female-threaded through boring extending from an inside of the housing to the outside of the housing, wherein at least a portion of the sensor assembly is mounted on the mechanical adjustment device.

13. The brake-wear monitoring system of claim 12, wherein the female-threaded through boring extends parallel to the piston axis.

* * * * *